United States Patent
Chen et al.

(10) Patent No.: US 9,322,710 B2
(45) Date of Patent: Apr. 26, 2016

(54) OPTICAL SENSING DEVICE HAVING PLURAL SENSING UNITS EACH RECEIVES SCANNING SIGNALS WITH DIFFERENT VOLTAGE LEVELS

(71) Applicant: AU Optronics Corp., Hsin-Chu (TW)

(72) Inventors: Yung-Da Chen, Hsin-Chu (TW); Yueh-Hung Chung, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 285 days.

(21) Appl. No.: 14/017,916

(22) Filed: Sep. 4, 2013

(65) Prior Publication Data
US 2014/0239159 A1 Aug. 28, 2014

(30) Foreign Application Priority Data
Feb. 22, 2013 (TW) .................. 102106310

(51) Int. Cl.
*G01J 1/46* (2006.01)
*G01J 1/42* (2006.01)

(52) U.S. Cl.
CPC . *G01J 1/4204* (2013.01); *G01J 1/46* (2013.01)

(58) Field of Classification Search
CPC ......... G01J 1/4204; G01J 1/46; G01J 1/4228; G01J 1/44; G01J 1/42; H03F 3/08; H03F 3/087; H01L 27/14643; H01L 27/14609; H01L 27/14603; H01L 27/1446; H01L 27/14612; H01L 27/14616; H01L 27/14641; H01L 27/14679; H01L 27/14681; H05B 37/0218; H04N 5/335; H04N 5/378; H01J 40/14; Y02B 20/46; E06B 2009/2464; G01S 3/783; G01S 3/784; H03K 23/78; H03K 19/14; H03K 17/941; H03K 17/60; H03K 17/687; H03K 17/9627; H03K 17/9629; H03K 17/9631

USPC ...... 250/208.3, 208.1, 208.2, 214 R, 214 AL, 250/214 B; 257/290–292, 440; 348/294–311

See application file for complete search history.

(56) References Cited

U.S. PATENT DOCUMENTS

| | | | | |
|---|---|---|---|---|
| 5,182,447 | A * | 1/1993 | Nakayama | G02B 7/36 250/208.1 |
| 8,008,613 | B2 * | 8/2011 | Tam | G01J 1/1626 250/214 AL |
| 2009/0160830 | A1 * | 6/2009 | Omi | G01J 1/02 345/204 |

* cited by examiner

*Primary Examiner* — Que T Le
(74) *Attorney, Agent, or Firm* — Locke Lord LLP; Tim Tingkang Xia, Esq.

(57) ABSTRACT

An optical sensing device includes a plurality of scanning lines having a plurality of first scanning lines and a plurality of second scanning lines, a plurality of sensing lines, a plurality of reading lines, and a plurality of optical sensing modules electrically connected to the scanning lines. Each optical sensing module includes a first optical sensing unit and a second optical sensing unit, each of which includes a sensing unit, a charge storage unit, and a reading unit. The optical sensing module further includes a plurality of differential amplifiers electrically connected to the corresponding reading lines, for determining the difference between the reading lines, wherein the difference indicates the ambient light variation. A first transistor of the sensing unit of the first optical sensing unit is different to a first transistor of the sensing unit of the second sensing unit in channel width.

19 Claims, 7 Drawing Sheets

OPTICAL SENSING DEVICE HAVING PLURAL SENSING UNITS EACH RECEIVES SCANNING SIGNALS WITH DIFFERENT VOLTAGE LEVELS

CROSS-REFERENCE TO RELATED APPLICATIONS

The present application is based on, and claims priority from, Taiwan Application Serial Number 102106310, filed on Feb. 22, 2013, the disclosure of which is hereby incorporated by reference herein in its entirety.

BACKGROUND OF THE DISCLOSURE

1. Field of Disclosure

This disclosure relates to an optical sensing device, and more particularly to an optical sensing device of which the adjacent reading lines are coupled to the optical sensing units with different characteristic value.

2. Related Art

Please refer to FIG. 1, which illustrates a schematic diagram of the conventional optical sensing module. The optical sensing module 100 comprises an optical sensing unit 102, a reading unit 104, and a charge storage unit 106. The optical sensing unit 102 is connected to a control line 107 with a predetermined voltage level $V_g$, such as 5V. The reading unit 104 is connected to the reading line 108 for outputting a readout voltage $V_{out}$. The other terminal of the optical sensing unit 102 is connected to a scanning signal with a predetermined voltage level $V_s$. The reading unit 104 is connected to another control line 112 with the predetermined voltage level $V_g$. The charge storage unit 106 is electrically coupled to the optical sensing unit 102 and the reading unit 104. The reading unit 104 is enabled before the optical sensing unit 102 is enabled. In other words, before the control line 107 enables the optical sensing unit 102, the control line 112 enables the reading unit 104.

While the optical sensing unit 102 is enabled, a capacitor C in the charge storage unit 106 is recharged so that the capacitor C has a cross voltage $V_a$. The capacitor C is connected to a DC voltage. When the optical sensing unit is exposed to light, the cross voltage $V_a$ is decreased owing to the current leakage according to the strength of light. The voltage level of the cross voltage of the capacitor C is read out to the reading line 108 when the reading unit 104 is enabled. The reading line 108 is connected to a reading circuit which is not shown in FIG. 1, and the reading circuit determines the strength of light received by the optical sensing module 100 according to the voltage level of the cross voltage of the capacitor C read by the reading unit 104.

The optical sensing module 100 may comprise a plurality of aforementioned optical sensing units 102, and each optical sensing unit corresponds to one aforementioned reading line 108. Because the light received by the optical sensing module may be received by more than one optical sensing unit, more than one reading line 108 will reflect a variation of voltage of the capacitor C. Hence, the reading lines 108 of the optical sensing module are connected to a differential amplifier so as to determine a region receiving the light. As above, because more than one optical sensing unit 102 receives the light, a method for increasing the sensitivity of the optical sensing module 100 for determining the region receiving the light is a topic to be solved in this disclosure.

SUMMARY OF THE DISCLOSURE

The optical sensing module comprises a plurality of scanning lines comprising a plurality of first scanning lines and a plurality of second scanning lines, a plurality of sensing lines, a plurality of reading lines, and a plurality of optical sensing modules, electrically coupled to the plurality of scanning lines, respectively. Each optical sensing module comprises a first optical sensing unit and a second optical sensing unit. Each of the optical sensing units comprises at least one sensing unit, a charge storage unit, and a reading unit. The sensing unit comprises a first terminal electrically coupled to a corresponding sensing line, a second terminal, and a control terminal electrically coupled to a corresponding scanning line. The reading unit comprises a first terminal and a second terminal respectively electrically coupled to corresponding reading lines among the plurality of reading lines. The reading unit also comprises a control terminal electrically coupled to corresponding scanning line among the plurality of first scanning lines or second scanning lines. The optical sensing module further comprises a plurality of differential amplifiers, electrically coupled to the corresponding reading lines, for computing a voltage difference between reading lines so as to indicate an ambient light variation detected by the optical sensing module. The channel width of the first transistor in the sensing unit of the first optical sensing unit is different from the channel width of the first transistor in the sensing unit of the second optical sensing unit.

BRIEF DESCRIPTION OF THE DRAWINGS

The disclosure will become more fully understood from the detailed description given herein below for illustration only, and thus are not limitative of the disclosure, and wherein.

DETAILED DESCRIPTION OF THE DISCLOSURE

The detailed features and advantages of the disclosure are described below in great detail through the following embodiments, the content of the detailed description is sufficient for those skilled in the art to understand the technical content of the disclosure and to implement the disclosure there accordingly. Based upon the content of the specification, the claims, and the drawings, those skilled in the art can easily understand the relevant objectives and advantages of the disclosure.

Figure 1:
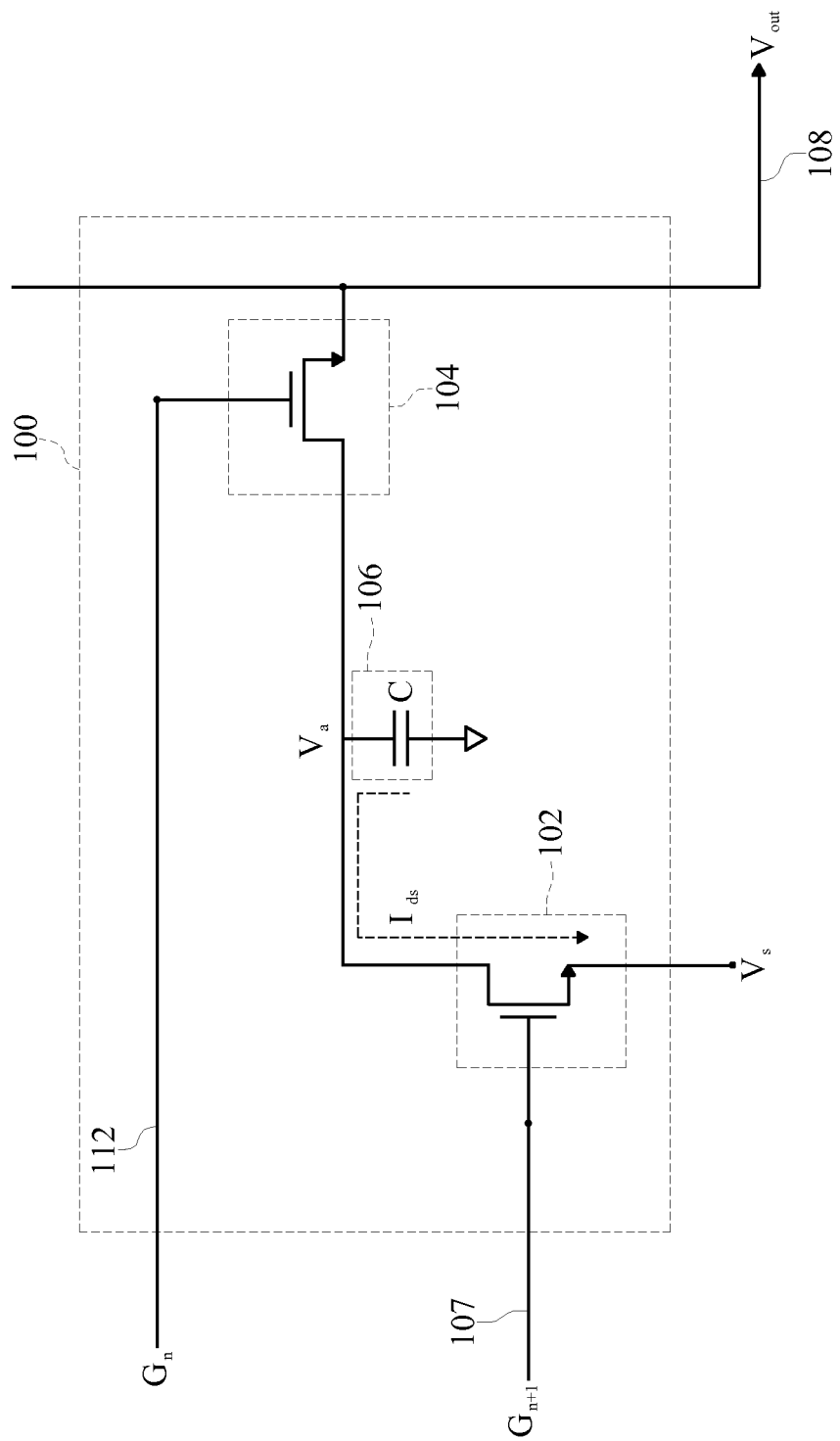
FIG. 1 illustrates a schematic diagram of a conventional optical sensing module.
Figure 2:
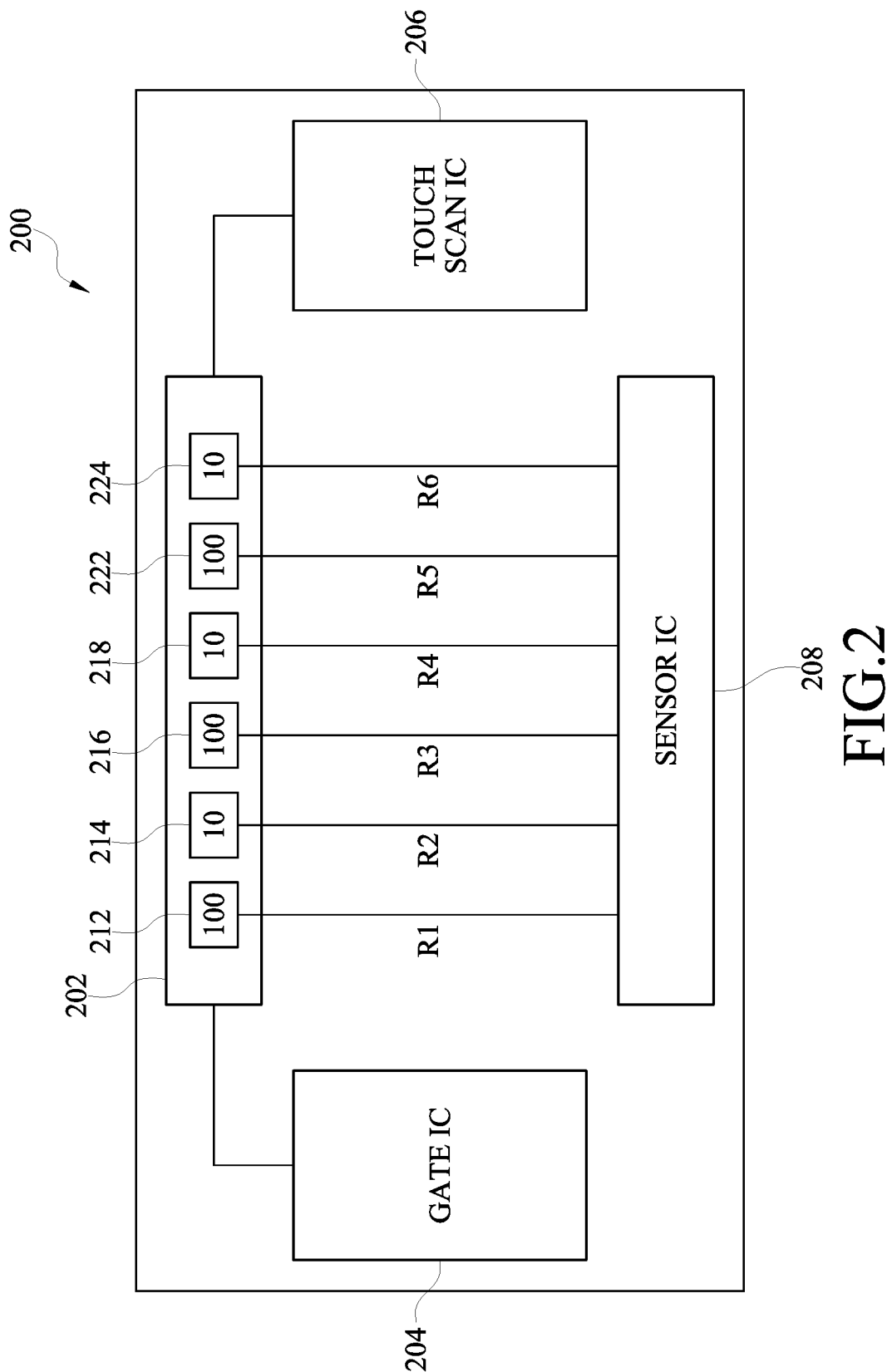
FIG. 2 illustrates a block diagram of a display sensing device in accordance with an embodiment in this disclosure.

Please refer to FIG. 2, which illustrates a block diagram of a display sensing device in accordance with an embodiment in this disclosure. The display sensing device 200 comprises a gate integrated circuit (IC) 204, a touch scan IC 206, a sensor IC 208, and an optical sensing module 202. The optical sensing module 202 comprises a plurality of optical sensing units 212 to 224. Each of the optical sensing units 212 to 224 is electrically coupled to both of the gate drive IC 204 and the touch scan IC 206. Each of the optical sensing units 212 to 224 is also electrically coupled to one of a plurality of reading lines R1-R6. For example, the optical sensing unit 212 is electrically coupled to the reading unit R1, and the optical sensing unit 214 is electrically coupled to the reading line R2. Hence, each of the reading lines R1 to R6 is capable of sensing an ambient light variation detected by the optical sensing units 212 to 224.

The characteristic values of two adjacent optical sensing units among the optical sensing units 212 to 224 are different. For instance, the channel widths of the transistors in the optical sensing unit 212 are different from the channel widths of the transistors in the optical sensing unit 214. Precisely, the channel width of each transistor in the optical sensing unit 212 is 100 um while the channel width of each transistor in the optical sensing unit 214 is 10 um. Similarly, the channel width of each transistor in the optical sensing unit 216 is 100 um while the channel width of each transistor in the optical sensing unit 218 is 10 um. In an embodiment, the channel width of each transistor in the optical sensing units 212, 216, and 222 is 100 um while the channel width of each transistor in the optical sensing units 214, 218, and 224 is 10 um. The number in each block of the optical sensing units 212 to 224 represents the channel width of the transistor therein.

In another embodiment, the characteristic value aforementioned is the gate-to-source voltage ($V_{gs}$) of each transistor in the optical sensing units 212 to 224. That is, the gate-to-source voltage of the transistor in the optical sensing unit 212 is different from the gate to source voltage of the transistor in the optical sensing unit 214. Further, each of the optical sensing unit 212 to 224 comprises one or more transistors according to various requirements.

Figure 3:
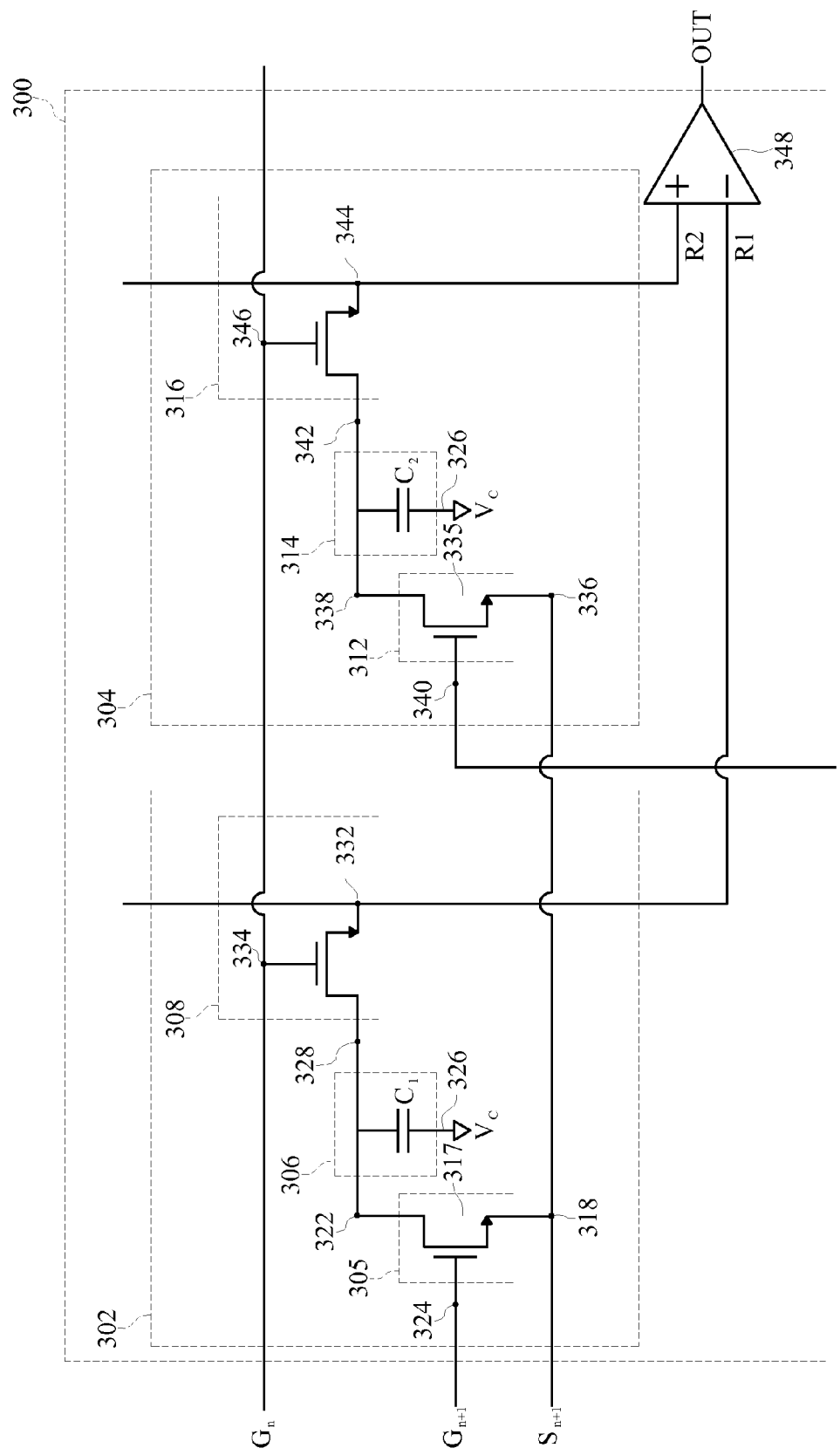
FIG. 3 illustrates a schematic circuit diagram of an optical sensing module in accordance with an embodiment in this disclosure.

Please refer to FIG. 2 and FIG. 3. FIG. 3 illustrates a schematic circuit diagram of an optical sensing module in accordance with an embodiment in this disclosure. The optical sensing module 300 comprises a first optical sensing unit 302 and a second optical sensing unit 304. The first optical sensing unit 302 comprises a sensing unit 305, a charge storage unit 306, and a reading unit 308. Similarly, the second optical sensing unit 304 comprises a sensing unit 312, a charge storage unit 314, and a reading unit 316. The sensing unit 305 of the first optical sensing unit 302 comprises a first terminal 318 connected to the sensing line $S_{n+1}$, a second terminal 322, and a control terminal 324 connected to the scanning line $G_{n+1}$. The charge storage unit 306 is connected between the second terminal 322 of the sensing unit 305 and a common voltage terminal 326 with a voltage level $V_c$. Similarly, the reading unit 308 of the first optical sensing unit 302 comprises a first terminal 328 connected to the charge storage unit 306, a second terminal 332 connected to the reading line R1, and a control terminal 334 connected to another scanning line $G_n$.

In an embodiment, the sensing unit 305 comprises a transistor 317. The first terminal of the transistor 317 is the first terminal 318 of the sensing unit 305. The second terminal of the transistor 317 is the second terminal 322 of the sensing unit 305. The control terminal of the transistor 317 is the control terminal 324 of the sensing unit 305.

Similarly, the sensing unit 312 of the second optical sensing unit 304 comprises a first terminal 336 connected to the sensing line $S_{n+1}$, a second terminal 338, and a control terminal 340 connected to the scanning line $W_{n+1}$. The charge storage unit 314 is connected between the second terminal 338 of the sensing unit 312 and a common voltage terminal 326 with the voltage level $V_c$. Similarly, the reading unit 316 of the second optical sensing unit 304 comprises a first terminal 342 connected to the charge storage unit 314, a second terminal 344 connected to another reading line R2, and a control terminal 346 connected to the scanning line $G_n$.

In an embodiment, the sensing unit 312 comprises a transistor 335. The first terminal of the transistor 335 is the first terminal 336 of the sensing unit 312. The second terminal of the transistor 335 is the second terminal 338 of the sensing unit 312. The control terminal of the transistor 335 is the control terminal 340 of the sensing unit 312.

In an embodiment, the scanning line $G_{n+1}$ and the scanning line $W_{n+1}$ provide logic low voltage with different voltage levels. For example, the scanning line ($G_{n+1}$) provides a logic low voltage with −6 volt while the scanning line ($W_{n+1}$) provides a logic low voltage with −9 volt. Meanwhile, the scanning line ($G_{n+1}$) and the scanning line ($W_{n+1}$) provide logic high voltage with the same voltage level. Hence, the gate to source voltage of the transistor 317 is different from the gate to source voltage of the transistor 335.

The optical sensing module 300 further comprises a differential amplifier 348 electrically coupled to the corresponding reading lines R1 and R2. The differential amplifier 348 comprises a positive input terminal and a negative input terminal. The negative input terminal is electrically coupled to the reading line R1 corresponding to the first optical sensing unit 302. The positive input terminal is electrically coupled to the reading line R2 corresponding to the second optical sensing unit 304. The differential amplifier 348 is used for computing a voltage difference between the reading line R1 and the reading line R2. The difference relates to an ambient light variation detected by the optical sensing module 300.

In an embodiment, the channel width of the transistor in the sensing unit 305 of the first optical sensing unit 302 is different from the channel width of the transistor in the sensing unit 312 of the second optical sensing unit 304. For example, the channel width of the transistor 317 in the sensing unit 305 of the first optical sensing unit 302 is 100 um while the channel width of the transistor 335 in the sensing unit 312 of the second optical sensing unit 304 is 10 um.

When the sensing unit 305 and the sensing unit 312 are enabled, the capacitor $C_1$ of the charge storage unit 306 and the capacitor $C_2$ of the charge storage unit 314 are charged. when the sensing unit 305 and the sensing unit 312 are exposed to light or experience an ambient light variation, the sensing unit 305 and the sensing unit 312 suffer from current leakage, and the charges stored in the capacitor $C_1$ and the charges stored in the capacitor $C_2$ decrease. If the channel width of the transistor in the optical sensing unit is larger, the current leakage is larger, and the charge stored in the capacitor is less. In the present embodiment, the channel width of the transistor 317 is larger than the channel width of the transistor 335, so the voltage $V_a$ of the charge storage unit 306 is less than the voltage $V_a$ of the charge storage unit 314.

The aforementioned voltages $V_a$ are transferred to the differential amplifier 348 via the reading lines R1 and R2 when the reading unit 308 and the reading unit 316 are enabled. Because the channel width of the transistors in the sensing unit 305 and the channel width of the transistors in the sensing unit 312 are different, the voltage difference between the voltage $V_a$ of the charge storage unit 306 and the voltage $V_a$ of the charge storage unit 314 is more obvious than the voltage difference between two transistors with the same channel width. The more obvious difference is helpful for the optical sensing device in this disclosure to more correctly detect a location or area where there is an ambient light variation.

In this and some embodiments, a threshold voltage of the transistor 317 is different from a threshold voltage of the transistor 335.

The gate drive IC 204 in FIG. 2 is electrically coupled to the control terminal 324 of the sensing unit 305 and the control terminal 334 of the reading unit 308 in the first optical sensing unit 302 in FIG. 3. The gate drive IC 204 is also electrically coupled to the control terminal 340 of the sensing unit 312 and the control terminal 346 of the reading unit 316 in the second optical sensing unit 304 in FIG. 3. The gate drive IC 204 is used for controlling a voltage difference between the control terminal 324 and the first terminal 318 of the transistor 317 and a voltage difference between the control terminal 340 and the first terminal 336 of the transistor 335, so that the two voltage differences are different. The design that the threshold voltage of the transistor 317 is different from the threshold voltage of the transistor 335 is helpful for increasing the sensitivity of the sensing unit 305 and the sensing unit 312. In other words, because the transistor 317 and the transistor 335 are enabled with different voltages, they may not be enabled at the same time under certain circumstances. As a consequence, a region receiving light is detected more accurately.

Figure 4:
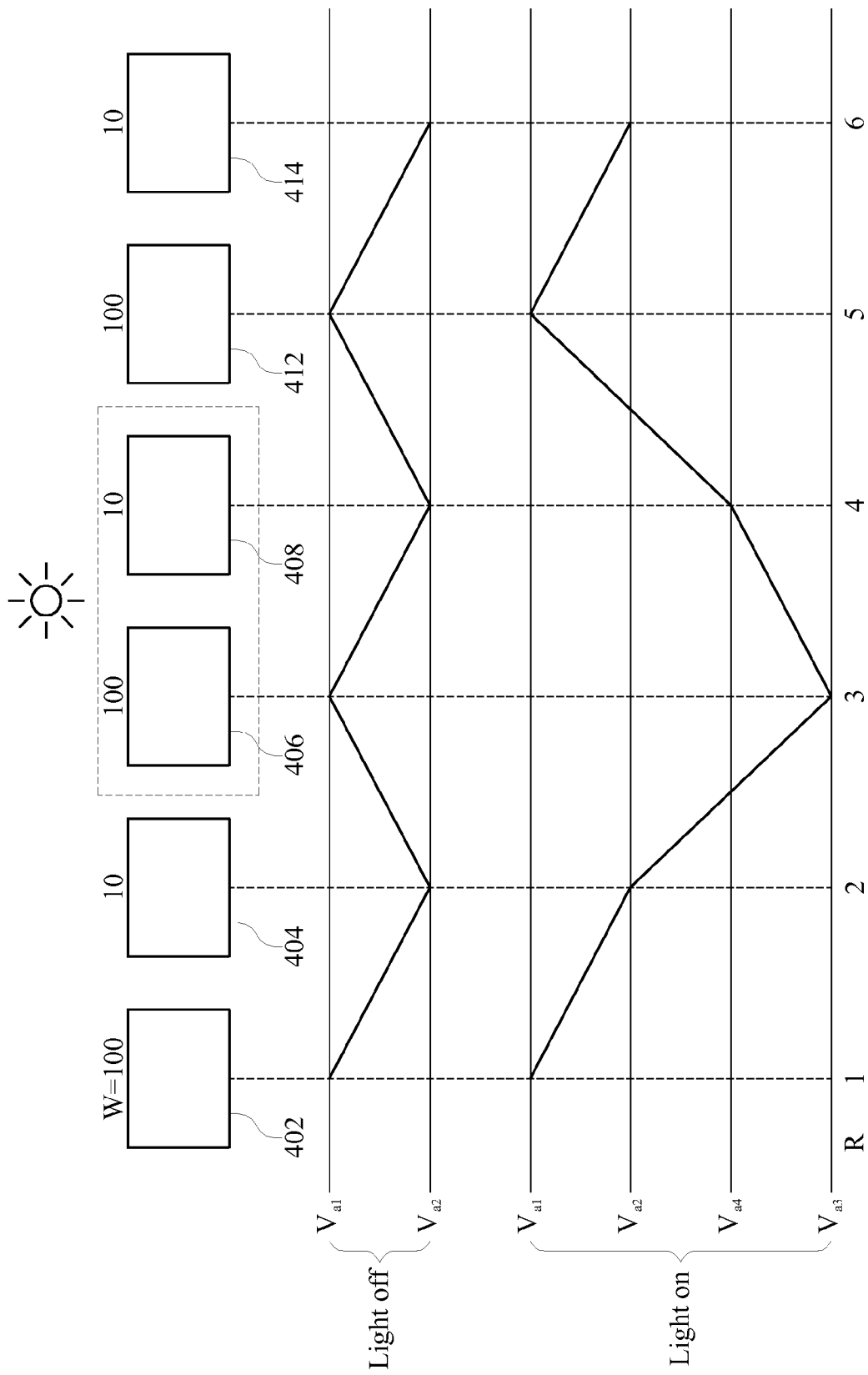
FIG. 4 illustrates a schematic diagram of the output of the corresponding reading line of the optical sensing unit in accordance with this disclosure when there is an ambient light variation.

In an embodiment, please refer to FIG. 4, which illustrates a schematic diagram of the output of the corresponding reading line of the optical sensing unit in accordance with this disclosure when there is an ambient light variation. Assuming that the optical sensing unit comprises sensing units 402 to 414, and the channel width, e.g. 100 um, associated with the sensing units 402, 406, and 412 is greater than the channel width, 10 um, associated with the sensing units 404, 408, and 414. When there is no ambient light variation or there is no light received by the optical sensing module, the output voltage $V_{a1}$ of the reading line corresponding to the sensing unit 402 is larger than the output voltage $V_{a2}$ of the reading line corresponding to the sensing unit 404. While there is an ambient light variation or there is light received by the sensing unit 406 and the sensing unit 408, the output voltage of the reading line corresponding to the sensing unit 406, which has a larger channel width of the transistors, is decreased to a voltage level $V_{a3}$, and the output voltage of the reading line corresponding to the sensing unit 408 is decreased to a voltage level $V_{a4}$. The output voltage of the reading lines corresponding to the sensing units 412 and 414, which doesn't receive light, remains at the output voltage $V_{a1}$ and the output voltage $V_{a2}$, respectively.

When the output difference is larger owing to the different channel widths, the waveform in FIG. 4 is capable of indicating the ambient light variation occurs in the region corresponding to the reading lines R3 and R4.

In one embodiment, the ambient light variation includes whether the optical sensing module receives light from a light pen or whether the optical sensing module is touched.

Figure 5:
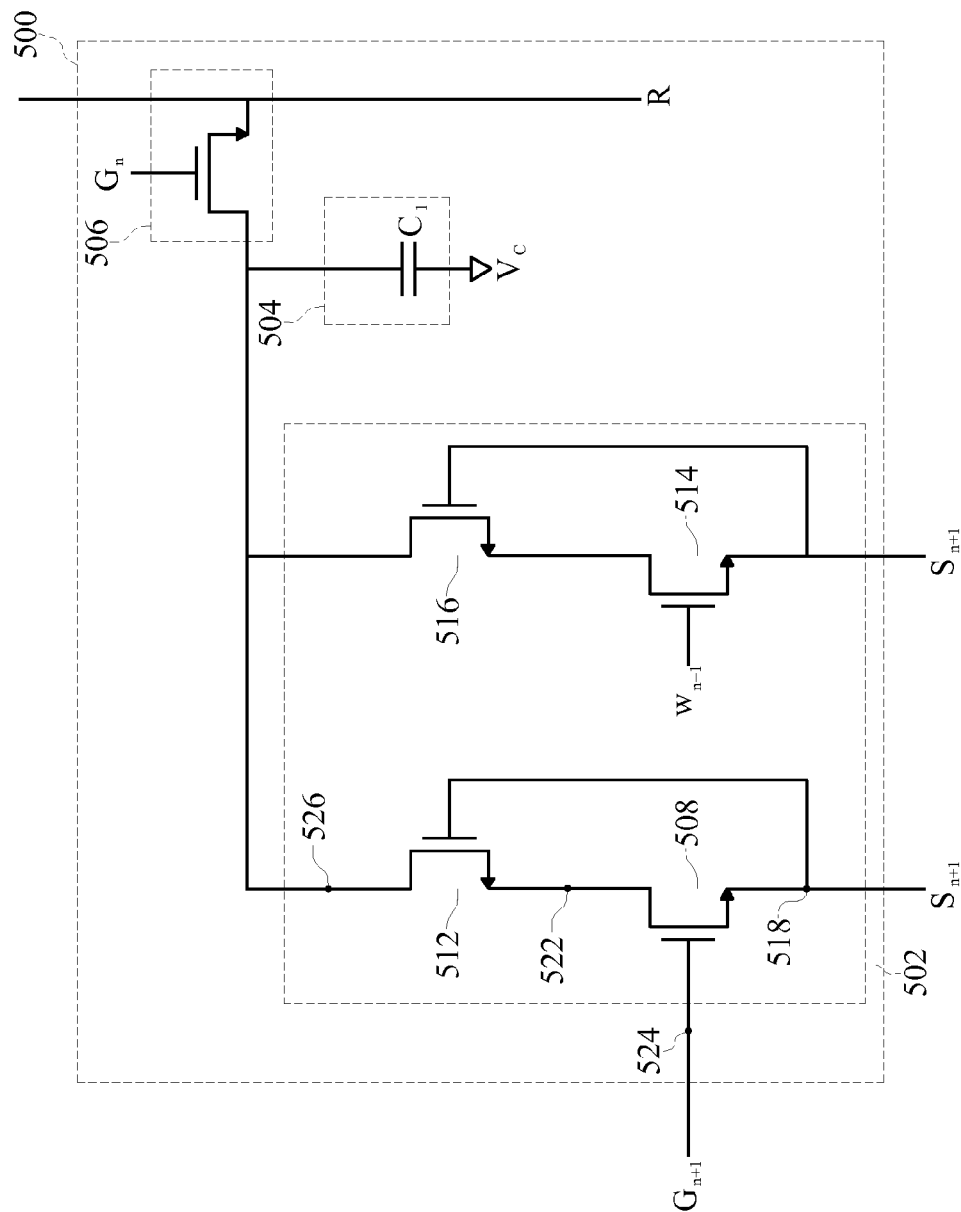
FIG. 5 illustrates a schematic circuit diagram of the optical sensing unit in accordance with an embodiment in this disclosure.

Please refer to FIG. 5, which illustrates a schematic circuit diagram of the optical sensing unit in accordance with one embodiment of this disclosure. The optical sensing unit 500 comprises a sensing unit 502, a charge storage unit 504, and a reading unit 506, electrically coupled to the reading line R. The detail of the charge storage unit 504 and the reading unit 506 may be referred to FIG. 3. The sensing unit 502 comprises a transistor 512, a transistor 514, and a transistor 516 further than the transistor 508.

The sensing unit 502 comprises a first terminal 518 connected to the sensing line ($S_{n+1}$), a second terminal 522, and a control terminal 524 connected to the scanning line ($G_{n+1}$). In one embodiment, the first terminal of the transistor 508 is the first terminal 518 of the sensing unit 502. The second terminal of the transistor 508 is the second terminal 522 of the sensing unit 502. The gate of the transistor 508 is the control terminal 524 of the sensing unit 502. The first terminal of the transistor 512 is the second terminal 522 of the transistor 508, and the second terminal of the transistor 512 is connected to the charge storage unit 504 and the reading unit 506. The control terminal of the transistor 512 is the first terminal 518 of the transistor 508.

The connection between the transistor 514, the transistor 516, the sensing line ($S_{n+1}$), and the scanning line ($W_{n+1}$) may be referred back to the aforementioned arrangement about the transistor 508 and the transistor 512. However, the gates (or the control terminals) of the transistor 514 and the transistor 516 is connected to the scanning line ($W_{n+1}$). The logic low voltage provided by the scanning line ($W_{n+1}$) is different from the logic low voltage provided by the scanning line ($G_{n+1}$), though the scanning lines ($W_{n+1}$) and ($G_{n+1}$) is capable of providing logic high voltage with the same voltage level. The channel width of the transistors in the optical sensing unit 500 substantially equals the sum of the channel widths of the transistor 508, the transistor 512, the transistor 514, and the transistor 516.

Figure 6:
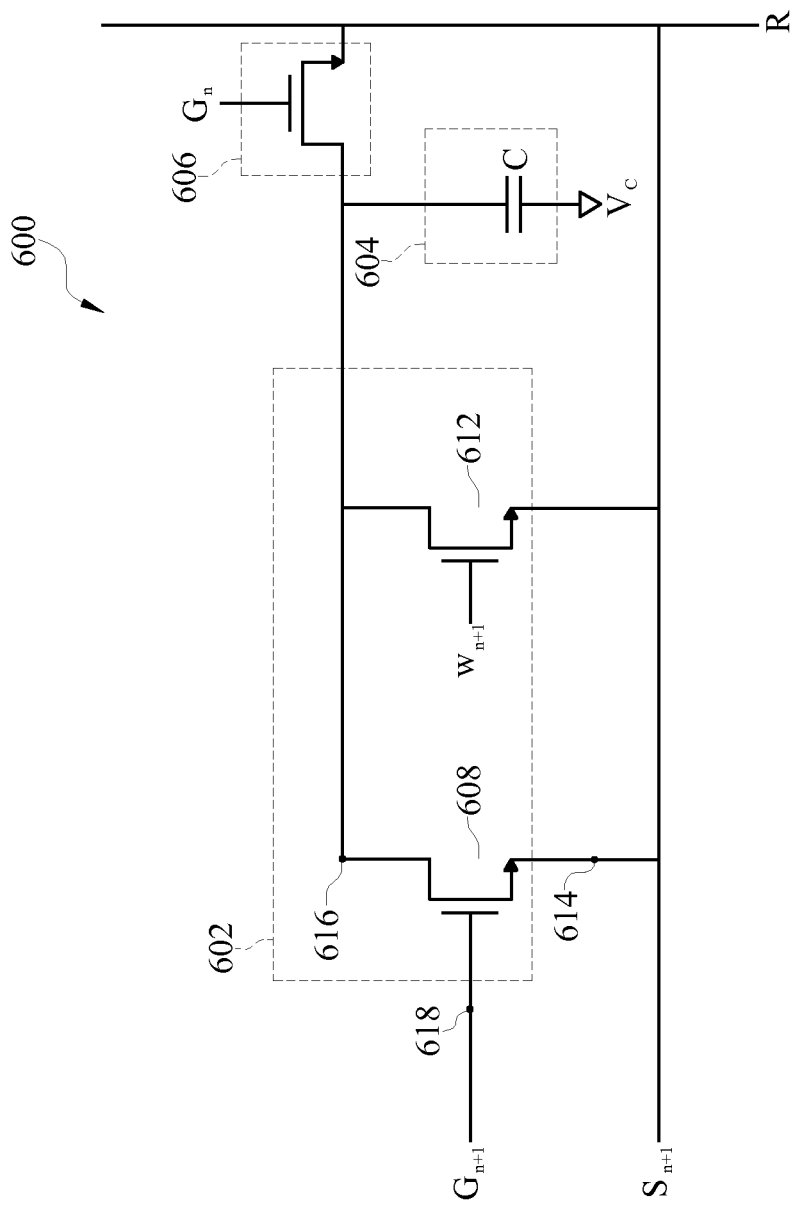
FIG. 6 illustrates a schematic circuit diagram of the optical sensing unit in accordance with an embodiment in this disclosure.

Please refer to FIG. 6, which illustrates a schematic circuit diagram of the optical sensing unit in accordance with one embodiment of this disclosure. The optical sensing unit 600 comprises a sensing unit 602, a charge storage unit 604, and a reading unit 606 connected to the reading line R. The detail of the charge storage unit 604 and the reading unit 606 may be referred to FIG. 3. The sensing unit 602 comprises a transistor 612 further than the transistor 508.

The first terminal 614 of the transistor 608 is connected to the sensing line ($S_{n+1}$). The second terminal 616 of the transistor 608 is connected to the charge storage unit 604 and the reading unit 606. The gate terminal 618, also called the control terminal, of the transistor 608 is connected to the scanning line ($G_{n+1}$). The gate terminal of the transistor 612 is connected to the scanning line ($W_{n+1}$) which provides a logic low voltage different from a logic low voltage provided by the scanning line ($G_{n+1}$). The other connections between the transistor 612, the charge storage unit 604, the reading unit 606, and the sensing line ($S_{n+1}$) is the same as the transistor 608.

The channel width of the transistor in the optical sensing unit 600 substantially equals to a sum of the channel width of the transistor 608 and the transistor 612.

Figure 7:
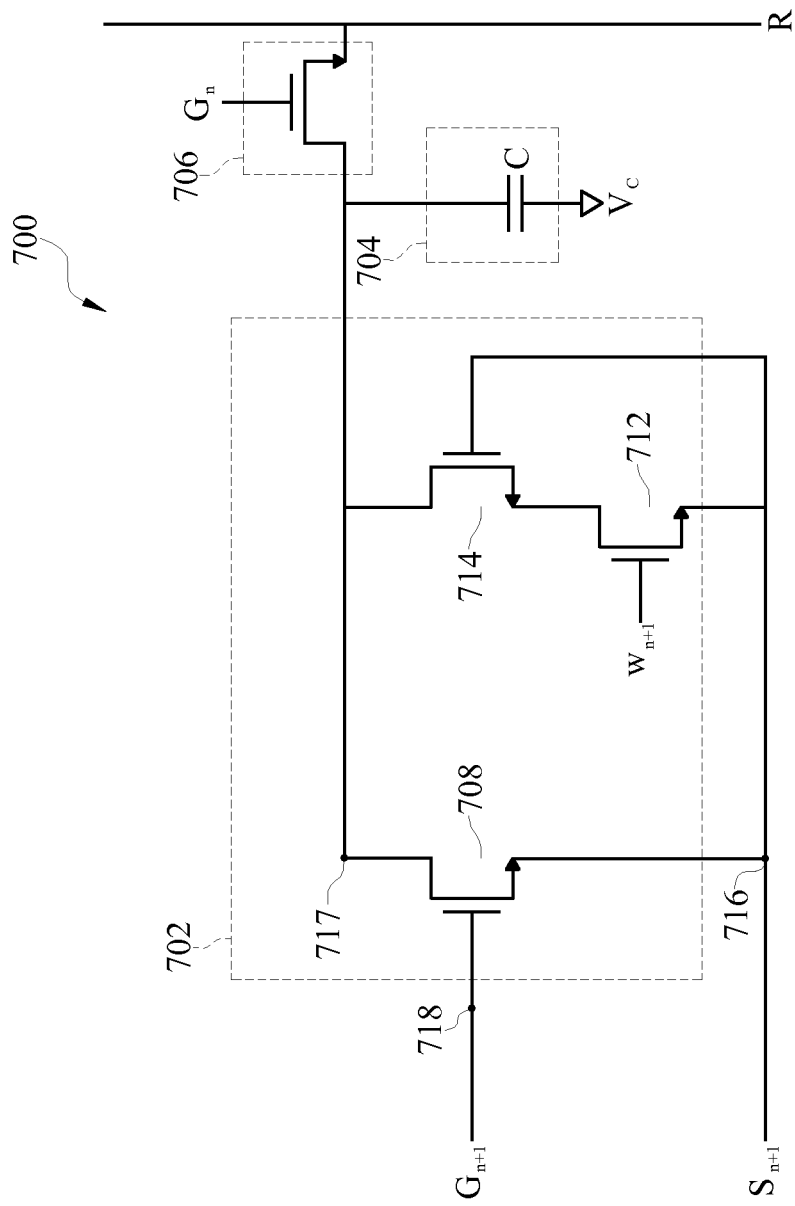
FIG. 7 illustrates a schematic circuit diagram of the optical sensing unit in accordance with an embodiment in this disclosure.

Please refer to FIG. 7, which illustrates a schematic circuit diagram of the optical sensing unit in accordance with one embodiment of this disclosure. The optical sensing unit 700 comprises a sensing unit 702, a charge storage unit 704, and a reading unit 706 connected to the reading line R. The detail of the charge storage unit 704 and the reading unit 706 may be referred to FIG. 3. The sensing unit 702 comprises a transistor 712 and a transistor 714 further than the transistor 708.

The first terminal 716 of the transistor 708 is connected to the sensing line ($S_{n+1}$). The second terminal 717 of the transistor 708 is connected to the charge storage unit 704 and the reading unit 706. The control terminal 718 of the transistor 708 is connected to the scanning line ($G_{n+1}$). The control terminal of the transistor 712 is connected to the scanning line ($W_{n+1}$) which provides a logic low voltage different from a logic low voltage provided by the scanning line ($G_{n+1}$). The other connections between the transistor 712, the transistor 714, the charge storage unit 704, the reading unit 706, and the sensing line ($S_{n+1}$) may be referred back to the transistor 508 and the transistor 512 in FIG. 5. The channel width of the transistors in the optical sensing unit 700 substantially equals to the sum of the channel width of the transistor 708 and the effective channel length of the transistor 712 and transistor 714. Hence, by choosing different number of the transistors and/or by choosing different size of the transistors, the optical sensing unit/sensing unit may be realized.

The difference between the transistors in the optical sensing units/sensing units, including the number of the transistors, differentiates each optical sensing unit/sensing unit. Compared with utilizing transistors with different threshold voltage, optical sensing unit in the present embodiment is more helpful for detecting the region receiving light accurately.

What is claimed is:

1. An optical sensing device, comprising:
   a plurality of scanning lines, comprising a plurality of first scanning lines and a plurality of second scanning lines;
   a plurality of sensing lines;
   a plurality of reading lines;
   a plurality of optical sensing modules, electrically coupled to corresponding scanning lines, wherein each optical sensing module comprises a first optical sensing unit and a second optical sensing unit, and each of the first optical sensing unit and the second optical sensing unit comprises:
      a plurality of sensing units, each of the sensing units comprising:
         a first terminal, electrically coupled to a corresponding sensing line among the sensing lines;
         a second terminal; and
         a control terminal, electrically coupled to a corresponding scanning line among the scanning lines, wherein each of the sensing units receives scanning signals with different voltage levels and each of the sensing units is fabricated with at least one semiconductor transistor;
      a charge storage unit, having a first terminal electrically coupled to the second terminal of each of the sensing units and a second terminal electrically coupled to a common voltage terminal; and
      a reading unit, comprising:
         a first terminal, electrically coupled to the second terminal of the sensing units;
         a second terminal, electrically coupled to a corresponding reading line among the reading lines; and
         a control terminal, electrically coupled to a corresponding scanning line among the scanning lines; and
   a plurality of differential amplifiers, electrically coupled to the reading lines correspondingly, wherein each differential amplifier has two input terminals respectively and electrically coupled to the corresponding reading line in the first optical sensing unit and the corresponding reading line in the second optical sensing unit, and is used for computing an ambient light variation related to the optical sensing module;
   wherein an equivalent transistor channel width of the plurality of sensing units in the first optical sensing unit is different from an equivalent transistor channel width of the plurality of sensing units in the second optical sensing unit.

2. The optical sensing device in accordance with claim 1, wherein a voltage difference between the control terminal and the first terminal of at least one of the plurality of sensing units of the first optical sensing unit is different from a voltage difference between the control terminal and the first terminal of at least one of the plurality of sensing units of the second optical sensing unit.

3. The optical sensing device in accordance with claim 1, wherein at least one of the plurality of sensing units comprises:
   a first transistor, comprising:
      a first terminal, electrically coupled to a corresponding sensing line among the sensing lines;
      a second terminal, electrically coupled to the charge storage unit; and
      a control terminal, electrically coupled to a corresponding scanning line among the scanning lines.

4. The optical sensing device in accordance with claim 3, wherein when a number of the plurality of sensing units is two, the sensing units are respectively electrically coupled to a first corresponding scanning line among the scanning lines and a second corresponding scanning line among the scanning lines, and a voltage level of the first corresponding scanning line is different from a voltage level of the first corresponding scanning line.

5. The optical sensing device in accordance with claim 1, wherein the plurality of sensing units comprise:
   a first transistor, comprising:
      a first terminal, electrically coupled to a corresponding sensing line among the sensing lines;
      a second terminal; and
      a control terminal, electrically coupled to a corresponding scanning line among the scanning lines; and
   a second transistor, comprising:
      a first terminal, electrically coupled to the second terminal of the first transistor;
      a second terminal, electrically coupled to the charge storage unit; and
      a control terminal, electrically coupled to a corresponding sensing line among the sensing lines.

6. The optical sensing device in accordance with claim 5, wherein a channel width of the first transistor is different from a channel width of the second transistor.

7. The optical sensing device in accordance with claim 5, wherein when a number of the plurality of sensing units is two, the sensing units are respectively and electrically coupled to a first corresponding scanning line among the scanning lines and a second corresponding scanning line among the scanning lines, and a voltage level of the first corresponding scanning line is different from a voltage level of the first second corresponding scanning line.

8. The optical sensing device in accordance with claim 1, wherein the ambient light variation includes whether the optical sensing module receives light from a light pen, or whether the optical sensing module is touched.

9. The optical sensing device in accordance with claim 1, wherein if a voltage difference between the control terminal and the first terminal of at least one of the plurality of sensing units of the first optical sensing unit is greater than a voltage difference between the control terminal and the first terminal of at least one of the plurality of sensing units of the second optical sensing unit, the optical sensing module is touched.

10. The optical sensing device in accordance with claim 1, wherein if a voltage difference between the control terminal and the first terminal of at least one of the plurality of sensing units of the first optical sensing unit is less than a voltage difference between the control terminal and the first terminal of at least one of the plurality of sensing units of the second optical sensing unit, the optical sensing module is untouched.

11. An optical sensing device for sensing an ambient light variation, comprising:
   an optical sensing array, electrically coupled to a plurality of first scanning lines, a plurality of second scanning lines, and a plurality of sensing lines, having a plurality of optical sensing units, wherein a first optical sensing unit among the plurality of optical sensing units is electrically coupled to a first reading line to output a first current based on the ambient light variation;

a second optical sensing unit, which is among the plurality of optical sensing units and adjacent to the first sensing unit, electrically coupled to a second reading line, for outputting a second current based on the ambient light variation, wherein the first current is greater than the second current when the ambient light variation exists; and a differential amplifier, electrically coupled to the first reading line and the second reading line, for computing the ambient light variation based on the first current and the second current, wherein each of the first optical sensing unit and the second optical sensing unit comprises a plurality of sensing units, and each of the sensing units comprises:

a first terminal, electrically coupled to a corresponding sensing line among the sensing lines;

a second terminal; and a control terminal, electrically coupled to a corresponding scanning line among the first scanning lines and the second scanning lines, wherein each of the sensing units receives scanning signals with different voltage levels and each of the sensing units is fabricated with at least one semiconductor transistor.

12. The optical sensing device in accordance with claim 11, wherein each of the plurality of optical sensing unit comprises:

a reading unit, electrically coupled to corresponding one of the first scanning lines and corresponding one of the reading lines;

a sensing unit, electrically coupled to a corresponding sensing line among the sensing lines and a corresponding scanning line among the second scanning lines, for sensing the ambient light variation based on an enable signal from the corresponding scanning line; and a capacitor, having a first terminal electrically coupled to the sensing unit and a second terminal electrically coupled to a common voltage terminal;

wherein a first characteristic value of the first optical sensing unit is different from a second characteristic value of the second optical sensing unit.

13. The optical sensing device in accordance with claim 12, wherein the sensing unit comprises:

a first transistor, comprising:

a first terminal, electrically coupled to the corresponding sensing line among the sensing lines;

a second terminal, electrically coupled to the first terminal of the capacitor; and a control terminal, electrically coupled to the corresponding scanning line among the scanning lines.

14. The optical sensing device in accordance with claim 12, wherein the sensing unit comprises:

a first transistor, comprising:

a first terminal, electrically coupled to the corresponding sensing line among the sensing lines;

a second terminal; and a control terminal, electrically coupled to the corresponding scanning line among the scanning lines; and a second transistor, comprising:

a first terminal, electrically coupled to the second terminal of the first transistor;

a second terminal, electrically coupled to the first terminal of the capacitor; and a control terminal, electrically coupled to the corresponding sensing line among the sensing lines.

15. The optical sensing device in accordance with claim 14, wherein a channel width of the first transistor is different from a channel width of the second transistor.

16. The optical sensing device in accordance with claim 14, wherein if a voltage difference between the control terminal of the sensing unit of the first optical sensing unit and the first terminal of the sensing unit of the first optical sensing unit is greater than a voltage difference between the control terminal of the sensing unit of the second optical sensing unit and the first terminal of the sensing unit of the second optical sensing unit, the optical sensing unit is touched.

17. The optical sensing device in accordance with claim 14, wherein if a voltage difference between the control terminal of the sensing unit of the first optical sensing unit and the first terminal of the sensing unit of the first optical sensing unit is less than a voltage difference between the control terminal of the sensing unit of the second optical sensing unit and the first terminal of the sensing unit of the second optical sensing unit, the optical sensing unit is untouched.

18. The optical sensing device in accordance with claim 11, wherein the ambient light variation includes whether the optical sensing unit receives light from a light pen, or whether the optical sensing unit is touched.

19. An optical sensing unit, comprising:

a sensing unit comprising:

a first transistor, having a first end, a second end, and a gate end; and a second transistor, having a first end, a second end, and a gate end, wherein the sensing unit receives scanning signals with different voltage levels from the gate end of the first transistor and the gate end of the second transistor, respectively, a first scanning line, for receiving a first scanning signal and connected to the gate end of the first transistor;

a second scanning line, for receiving a first scanning signal and connected to the gate end of the second transistor;

a sensing line, connected to the second end of the first transistor and the second end of the second transistor;

a reading unit, connected between a reading line and the sensing unit, wherein the reading unit is turned on according to the scanning signal; and a charge storage unit, coupled between the sensing unit, the reading unit and a common voltage terminal.

* * * * *